(12) United States Patent
Joseph

(10) Patent No.: US 7,832,567 B2
(45) Date of Patent: Nov. 16, 2010

(54) DROP-IN FILTER FOR SPRAY GUN RESERVOIR

(75) Inventor: Stephen C. P. Joseph, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 583 days.

(21) Appl. No.: 10/533,743

(22) PCT Filed: Dec. 2, 2003

(86) PCT No.: PCT/US03/38072

§ 371 (c)(1),
(2), (4) Date: May 4, 2005

(87) PCT Pub. No.: WO2004/060575

PCT Pub. Date: Jul. 22, 2004

(65) Prior Publication Data

US 2006/0065591 A1 Mar. 30, 2006

(30) Foreign Application Priority Data

Dec. 18, 2002 (GB) .................................. 0229399.1

(51) Int. Cl.
*B01D 35/02* (2006.01)
*B01D 35/00* (2006.01)

(52) U.S. Cl. ....................... 210/473; 210/474; 210/475; 210/477; 210/464; 210/485

(58) Field of Classification Search .................. 210/452, 210/460, 499, 485, 495, 228, 541; 55/525
See application file for complete search history.

(56) References Cited

U.S. PATENT DOCUMENTS 1,137,480 A * 4/1915 Gwynn ....................... 210/472

(Continued)

FOREIGN PATENT DOCUMENTS

DE 27 00 610 A1 7/1978

(Continued)

*Primary Examiner*—Krishnan S Menon
*Assistant Examiner*—Madeline Gonzalez
(74) *Attorney, Agent, or Firm*—Douglas B. Little

(57) ABSTRACT

A liquid supply assembly for use with a spray gun (FIG. 1) comprises a reservoir 9 provided with a drop-in filter 10 for removing solid particles from liquid added to the reservoir 9. The reservoir 9 has a lid 12 with an outlet opening 12E connectable via a spout 16 to the spray gun and a separate inlet opening 12D in which a support collar 27 of the filter 10 is located. The filter 10 comprises a tubular mesh body 10A having an open end and a closed end. The open end is connected to the support collar 27 and the mesh body 10A extends away from the inlet opening 12D within the reservoir 9. The mesh body 10A is sized to pass through the filler opening 12D and has a high flow capacity to permit rapid filling of the reservoir 9. The filter 10 may be left in place when the reservoir 9 is connected to the spray gun and the reservoir 9 may be discarded together with the filter 10 after use.

13 Claims, 6 Drawing Sheets

U.S. PATENT DOCUMENTS

| | | | | |
|---|---|---|---|---|
| 1,339,195 | A | * | 5/1920 | Grover ........................ 210/250 |
| 2,175,714 | A | * | 10/1939 | Brown ........................ 210/473 |
| 3,432,104 | A | | 3/1969 | Kaltenbach |
| 3,830,042 | A | * | 8/1974 | MacDonnell ............... 55/341.4 |
| 3,853,509 | A | * | 12/1974 | Leliaert ..................... 55/341.1 |
| 4,468,324 | A | * | 8/1984 | de Lappe et al. ............ 210/350 |
| 4,559,140 | A | | 12/1985 | Croteau |
| 4,882,055 | A | | 11/1989 | Stamstad |
| 5,061,303 | A | * | 10/1991 | Williams et al. ........... 55/341.1 |
| 5,186,828 | A | | 2/1993 | Mankin |
| 5,202,021 | A | | 4/1993 | Griffin et al. |
| 5,468,383 | A | * | 11/1995 | McKenzie .................. 210/232 |
| 5,690,710 | A | * | 11/1997 | Stephan ........................ 55/366 |
| 5,755,962 | A | * | 5/1998 | Gershenson et al. ........ 210/452 |
| 5,902,482 | A | * | 5/1999 | Seeley et al. ............. 210/493.1 |
| 5,916,435 | A | * | 6/1999 | Spearman et al. ........... 210/132 |
| 6,488,846 | B1 | | 12/2002 | Marangi |
| 6,536,687 | B1 | | 3/2003 | Navis et al. |
| 6,698,670 | B1 | | 3/2004 | Gosis et al. |
| 2002/0148763 | A1 | * | 10/2002 | Lutz et al. ................... 210/232 |

FOREIGN PATENT DOCUMENTS

| | | |
|---|---|---|
| EP | 0 987 060 A1 | 3/2000 |
| JP | 62-50713 | 3/1962 |
| JP | 59-31414 | 2/1984 |
| JP | 3-123925 | 12/1991 |
| WO | WO 92/11930 | 7/1992 |
| WO | WO 98/04333 | 2/1998 |
| WO | WO 98/32539 | 7/1998 |
| WO | WO 98/52834 | 11/1998 |
| WO | WO 02/085533 A1 | 10/2002 |

* cited by examiner

DROP-IN FILTER FOR SPRAY GUN RESERVOIR

FIELD OF THE INVENTION

This invention concerns improvements in or relating to filters for liquid supply assemblies. The invention has particular, but not exclusive application to liquid supply assemblies for liquid spraying apparatus such as spray guns, especially hand-held spray guns provided with a liquid supply assembly comprising a reservoir for the liquid to be sprayed mounted on the spray gun.

BACKGROUND OF THE INVENTION

Spray guns are widely used to apply a liquid to a substrate in a variety of industries. In the known spray guns, the liquid is contained in a reservoir attached to the spray gun from where it is fed to a spray nozzle. On emerging from the spray nozzle, the liquid is atomised and forms a spray with compressed air supplied to the nozzle. The liquid may be gravity fed or suction fed or, more recently, pressure fed by an air bleed from the compressed air line to the reservoir or even from the spray gun itself.

A common application of spray guns is in vehicle body repair shops when re-spraying a vehicle that has been repaired following an accident. A typical paint finish may require application of a primer, base coat, top coat and a clear lacquer. The presence of contaminants such as solid particles in the liquid to be sprayed can spoil the paint finish and extensive re-working is required to achieve an acceptable paint finish. In some instances, the solid particles may cause blockage of the spray gun itself requiring stripping down and cleaning of the spray gun to remove the blockage. In addition, the blockage may have an adverse effect on the spray and render the resulting paint finish unacceptable so that extensive re-working is again required to produce an acceptable paint finish. Re-working of the paint finish and, where required, unblocking of the spray gun, adds to costs both in terms of materials and time.

It is already known to provide a filter in the reservoir to remove contaminants as the liquid is withdrawn from the reservoir during operation of the spray gun. Typically, the reservoir has an outlet connected to an inlet on the spray gun and the filter is positioned across or within the outlet. The outlet is usually of comparatively small size compatible with the connection to the spray gun. The presence of solid particles in the liquid added to the reservoir can result in blockage of the filter so that flow of the liquid to the spray gun is restricted or, in extreme cases, prevented altogether.

A reduction in the flow of the liquid to the spray gun may have an adverse effect on the spray and the resulting paint finish may be unacceptable so that re-working is again required to obtain an acceptable paint finish. Moreover, opening of the reservoir is required to remove and replace the blocked filter with a new filter. This is time consuming and may require decanting of liquid remaining in the reservoir which is then returned to the reservoir when the new filter is in place. As a result, there is increased risk of spillage and possible introduction of contaminants into the liquid. Furthermore, some liquids require activation prior to spraying and have a relatively short life after activation. Delays caused by blockage of the filter may result in such liquids being unusable thereby adding further to costs.

It is also known to filter the liquid to remove solid particles prior to or when adding the liquid to the reservoir by employing a filter externally of the reservoir. This avoids the need to provide a filter within the reservoir but is usually time consuming due to the capacity of the filter being less than the rate at which the liquid can be freely poured into the reservoir. In addition, there is an increased risk of spillage if the addition of the liquid exceeds the capacity of the filter causing the liquid to overflow. Also, dust or other airborne contaminants may be entrained in the filtered liquid with the resulting potential problems outlined above.

WO 98/32539 discloses a reservoir for a spray gun comprising an outer container and an inner liner that is a close fit in the outer container. The liner is removable allowing a new, clean liner to be inserted when changing the liquid to be sprayed which reduces the amount of cleaning required. In one arrangement FIG. 12), the reservoir has an outlet connectable to the gun at one end and a lid at the other end that can be removed to add paint to the reservoir while attached to the gun. In this arrangement, and all the liquid dispensed by the gun passes through a mesh filter provided inside the liner, and the filter has a size and shape similar to the liner so there is no need for the liquid to be filtered when it is being poured into the reservoir.

WO 02/085533 discloses a reservoir for a spray gun having an inlet opening with a removable closure cap that is accessible when the reservoir is attached to the spray gun to allow liquid to be added to the reservoir without detaching the reservoir from the spray gun. In one arrangement, a removable "drop-in" sock filter can be used in conjunction with the inlet opening to filter liquid added to the reservoir. In this arrangement, the filter is not intended to remain in situ within the reservoir,

SUMMARY OF INVENTION

The present invention is intended to provide an improved filter for liquid supply assemblies used to supply spray guns with resulting benefits and advantages for the user.

More specifically, at least one embodiment of the present invention provides a filter for a liquid supply assembly that allows liquid to be added to a reservoir in a simple manner so that contaminants in the liquid can be removed at the time of adding the liquid to the reservoir.

Additionally, at least one embodiment of the present invention provides a high flow filter for a liquid supply assembly that permits rapid filling of a reservoir with filtered liquid for supply to a spray gun.

Furthermore, at least one embodiment of the present invention provides a filter for a liquid supply assembly that can be left in place when a reservoir containing the filter is attached to a spray gun.

Moreover, at least one embodiment of the present invention provides a filter for a liquid supply assembly that permits a reservoir containing the filter to collapse as liquid is withdrawn from the reservoir.

Other benefits and advantages of the invention are referred to later herein.

According to a first aspect of the present invention, there is provided a filter for a liquid supply assembly as defined in claim 1.

As used herein, the term "liquid" refers to all forms of flowable materials that can be applied to a surface using a spray gun (whether or not they are intended to colour the surface) including (without limitation) paints, primers, base coats, lacquers, varnishes and similar paint-like materials as well as other fluent materials which may be applied in atomised or non-atomised form depending on the properties and/or the intended application of the material and the term "liquid" is to be construed accordingly.

By this invention, the tubular body of the filter extends into the reservoir and can be arranged so that the surface area of the filter within the reservoir is optimised compared to the volume of the filter. As a result, the filter can have a high flow capacity that permits rapid filling of the reservoir with reduced risk of spillage. In this way, liquid can be filtered as it is poured into the reservoir to produce a supply of filtered liquid within the reservoir for supply to the spray gun when the reservoir is connected to the spray gun. Consequently, the filter does not interfere with flow of filtered liquid supplied to the spray gun and the risk of the spray gun being blocked or the surface finish being contaminated with solid particles in this liquid is reduced if not eliminated.

Preferably, the surface area to volume ratio of the tubular body is such that the liquid can be filtered at a rate compatible with the rate of addition of the liquid to provide rapid filling of the reservoir without spillage of the liquid. The surface area to volume ratio may vary depending on the properties of the liquid, for example viscosity, and the size of particles to be removed.

The tubular body of the filter may be comparatively rigid so as to maintain its shape. For example, the body of the filter may comprise a wire mesh. More preferably, however, the tubular body is flexible so that the filter can change shape. For example, the body of the filter may comprise a mesh of a plastics material such as polypropylene, polyester, polyamide (nylon) or any other suitable material. In this way, the filter may be supplied in a compact configuration to reduce space for storage and transportation. Furthermore, where the reservoir is collapsible as liquid is withdrawn in use, the filter may be left in place within the reservoir and conform to the collapsed condition of the reservoir. The mesh can be woven, non-woven or knitted depending on the material, application and requirements such as mesh size and/or uniformity. The mesh may be formed by any suitable method, for example a plastics mesh may be formed by moulding or extrusion.

The filter may have an axial length chosen to provide a suitable flow capacity for the liquid to be filtered. For example, the filter may have an axial length substantially the same as the depth of the reservoir in which it is received. In this way, the available surface area of the filter within the reservoir can be maximised for a given size of filler opening. Moreover, if the reservoir is connected to the spray gun with the filter left in place within the reservoir, as the level of liquid falls in the reservoir, liquid contained in the filter can pass through the mesh body at the surface of the liquid. As a result, the flow of liquid to the spray gun is not reduced or interrupted as the liquid passes through the mesh body.

The support collar may be sized to fit the filler opening and preferably has an external lip at the outer end to locate and retain the collar in the opening. The lip may seat around the marginal edge of the filler opening at the outer end of the wall bounding the filler opening. Alternatively, the filler opening may have a counterbore at the outer end of the wall in which the lip is received to locate against an internal shoulder within the filler opening. In this way, the collar is prevented from passing completely through the filler opening.

The support collar may be made of plastics, such as polypropylene, polyamide (nylon) or polyethylene and is preferably integral with the mesh body of the filter. For example, the support collar may be moulded onto the outer end of the mesh body. In this way, the support collar locates the mesh body of the filter within the reservoir and conforms the open end to the shape of the filler opening. For example, the support collar may be of circular, oval, square or other shape to match the shape of the filler opening.

The filter may be provided with means to assist in maintaining the tubular shape of the mesh body at least when liquid is added to the reservoir. In one arrangement, the filter may be provided with support hoops extending around the mesh body at axially spaced positions between the ends to maintain the tubular shape of the mesh body. The support hoops may be integral with the mesh body, for example the support hoops may be moulded with the mesh body. Preferably, the support hoops allow the filter to conform to the shape of the reservoir, for example if the reservoir is constructed to collapse as liquid is withdrawn in use. In another arrangement, the support collar may be connected to a cage that surrounds the mesh body within the reservoir. The cage may comprise a plurality of legs extending from the collar at the open end of the mesh body to a base element at the closed end of the mesh body. The legs are preferably uniformly spaced apart and may be flexible to allow the filter to conform to the shape of the reservoir, for example if the reservoir is constructed to collapse as liquid is withdrawn in use. Alternatively, the cage may be comparatively rigid to maintain the shape of the filter both when liquid is added to the reservoir and when liquid is withdrawn from the reservoir in use, for example if the reservoir does not collapse as liquid is withdrawn in use. The cage may be integral with the mesh body, for example, the cage may be moulded with the mesh body.

According to a second aspect of the present invention, there is provided a liquid supply assembly for use with spraying apparatus as defined in claim 10.

Preferably, the filler opening is provided in an end wall of the reservoir. In one arrangement, the reservoir comprises an open-topped container and a lid arranged to close the open end of the container and forming the end wall in which the filler opening is formed.

Advantageously, the lid is provided with an outlet connectable to the spray gun. In one arrangement, the outlet comprises a supply opening formed in the lid separately from the filler opening and leading to a tubular spout connectable to the spray gun. In this way, the filter may be left in position within the reservoir when the reservoir is connected to the spray gun.

The filler opening may be provided with a releasable closure such as a screw cap that can be removed when it is desired to add liquid to the reservoir and re-attached to close the filler opening when the reservoir is connected to the spray gun. With this arrangement, access to the filler opening may be provided to add liquid to the reservoir when the reservoir is connected to the spray gun.

Preferably, the filler opening is larger than the supply opening and both openings are offset from the central longitudinal axis of the reservoir. In this way, access to the filler opening may be improved when the reservoir is connected to the spray gun to allow liquid to be added to the reservoir without disconnecting the reservoir from the spray gun.

In another arrangement, the filler opening is located centrally of the lid and the outlet is provided by a separate connector releasably secured to the lid around the filler opening and having a tubular spout connectable to the spray gun. In this way, the reservoir can be detached from the connector to provide access to the filler opening when it is desired to add liquid to the reservoir. With this arrangement, the filter is removed after adding the liquid and before the reservoir is re-attached to the connector.

The lid and container may be permanently secured together around the marginal edge of the open of the container. For example the lid and container may be bonded or welded in fluid tight manner to each other. Alternatively, the lid and container may be releasably secured together in fluid tight manner. For example, the lid may be clamped to the container.

In one arrangement, the container is collapsible as liquid is withdrawn from the reservoir in use. In this arrangement, the container may have a flexible sidewall and a comparatively rigid base such that the container can be stood upright unsupported on the base and the sidewall is foldable to move the base towards the lid as liquid is withdrawn from the reservoir. The lid is comparatively rigid and may have a dependent skirt that is located within and secured around the inner marginal edge of the open end of the container so that the container is supported by the lid. As a result, when filled with liquid and attached to the spray gun, the stability of the reservoir is improved assisting handling of the spray gun, especially as liquid is withdrawn causing the reservoir to collapse. The lid may be provided with an extension sleeve or cage surrounding the container to provide additional support for the container In another arrangement, the container is received in an outer container to which the reservoir is secured by a collar releasably attached to the outer container over the lid. In this arrangement, the reservoir container acts as a liner for the outer container and, after use, the reservoir can be thrown away and the outer container and collar assembled with another reservoir.

Preferably, the reservoir is adapted for releasable connection to the spray gun. For example, the reservoir and spray gun may be provided with co-operating bayonet type formations. In this way, the reservoir can be connected to and released from the spray gun in a simple manner. Alternatively, the reservoir and spray gun may be provided with complementary screw threads.

The spray gun inlet may comprise a socket to receive the spout for connecting the reservoir outlet to the inlet. The spray gun and reservoir may be provided with the co-operating bayonet type formations or with complementary screw threads for releasably securing the reservoir to the spray gun. In one arrangement, the spout and socket are provided with bayonet formations engageable within the socket. For example bayonet lugs on the spout received in bayonet grooves in the socket. In another arrangement, spray gun and reservoir are provided with bayonet formations engageable externally of the socket. For example, the socket may have an external flange co-operable with a pair of hook members arranged on opposite sides of the spout. The socket may be an integral part of the spray gun or it may be detachable. For example, the socket may be formed by an adaptor permanently or releasably secured to the spray gun.

The reservoir may be supplied empty with the filter in place ready for the user to fill with liquid. Alternatively, the filter may be supplied separately for the user to insert in the filler opening before adding liquid. Where the reservoir is collapsible, it may be collapsed to a compact form for storage and transportation and, after use may be discarded in the collapsed condition. The filter is preferably also collapsible so that it can be supplied in place with the reservoir collapsed and, after use, can be discarded with the reservoir.

Alternatively, the reservoir may be supplied pre-filled with liquid and the spout sealed until it is desired to attach the reservoir to the spray gun. For example, the spout may be provided with a removable closure or a rupturable membrane. Where provided, the membrane may be ruptured prior to or when the spout is attached to the spray gun. In this arrangement, the reservoir may be provided with the filter in place so that the user does not have to provide a filter when adding liquid to the reservoir. Alternatively, the filter may be supplied separately for the user to insert if it is desired to add liquid to the reservoir.

Pre-filling may be employed for liquids that can be packaged and stored until required without degrading. Thus, pre-filling may be useful for liquids that can be supplied ready for use (i.e. without requiring modification to match the colour to an exiting colour). For example base coats in standard colours of a specified shade and/or primers or lacquers that can be supplied in a non-activated form and activated (if necessary) by suitable means such as by exposure to a source of energy, e.g. ultraviolet radiation, visible light or electrical energy at the time of use.

The liquid supply apparatus may be used with a spray gun to provide spraying apparatus. The spray gun may be of the gravity feed, suction feed or pressure feed type.

BRIEF DESCRIPTION OF THE DRAWINGS

Embodiments of the invention will now be described in more detail by way of example only, with reference to the accompanying drawings in which:—

DETAILED DESCRIPTION OF THE EXEMPLARY EMBODIMENTS

Figure 1:
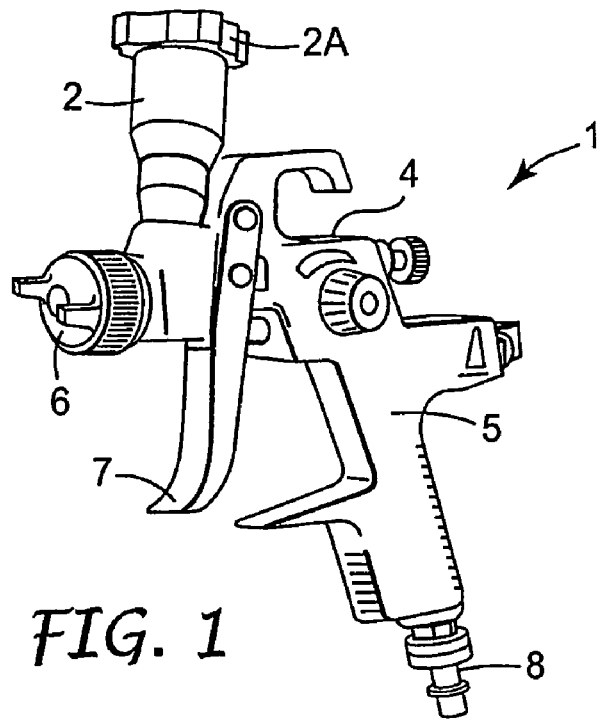
FIG. 1 is a perspective view of a spray gun for use with a liquid supply assembly according to the present invention.
Figure 2:
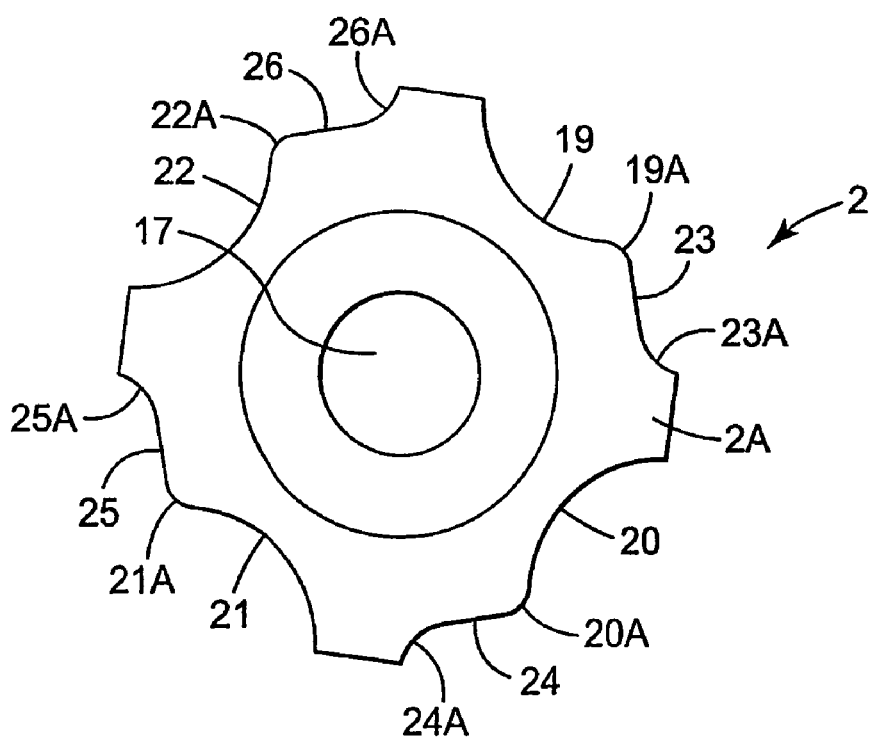
FIG. 2 is an end view of the spray gun adaptor shown in FIG. 1.
Figure 3:
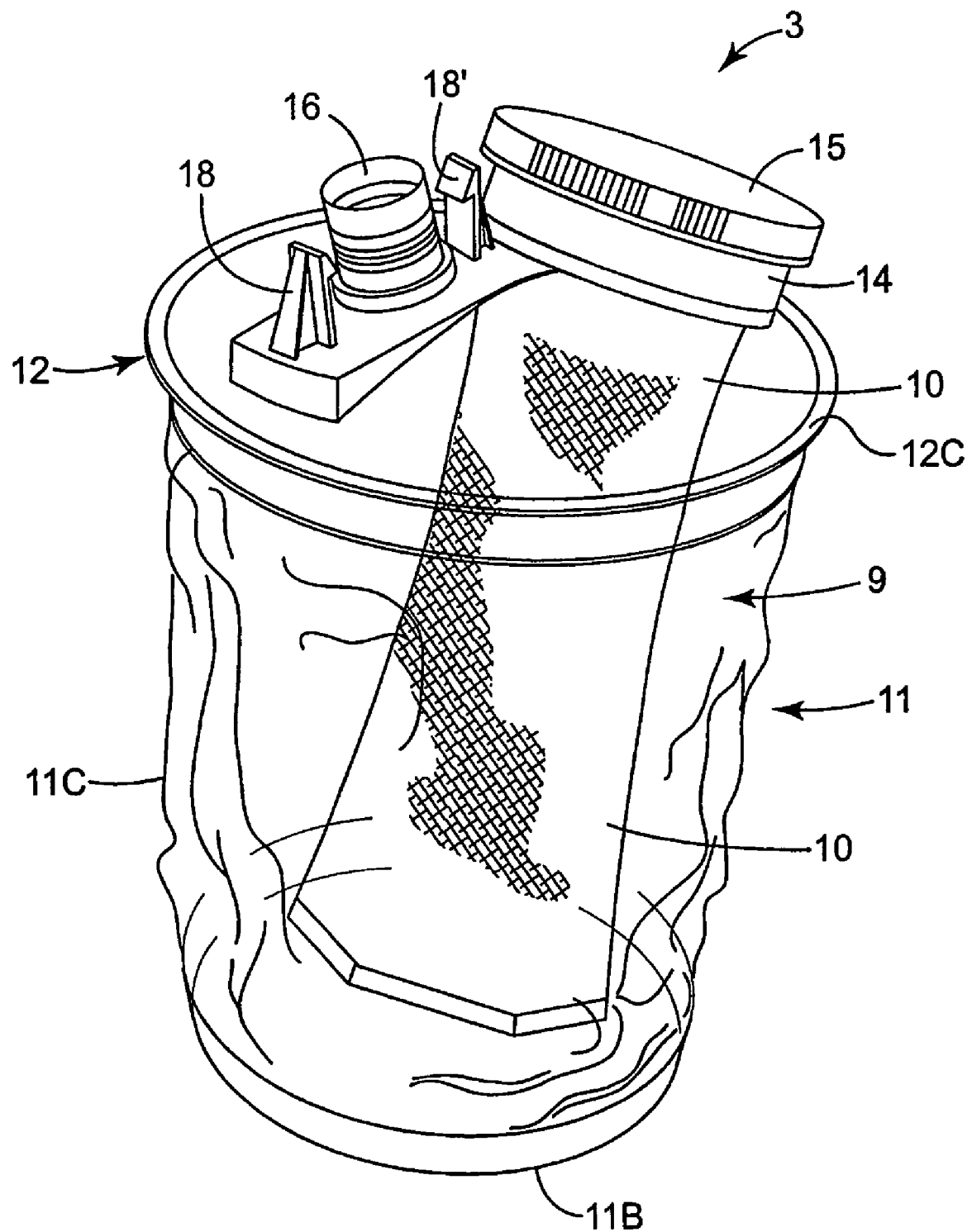
FIG. 3 is a perspective view of a liquid supply assembly for use with the spray gun of FIGS. 1 and 2 and incorporating a filter according to a first embodiment of the present invention.
Figure 4:
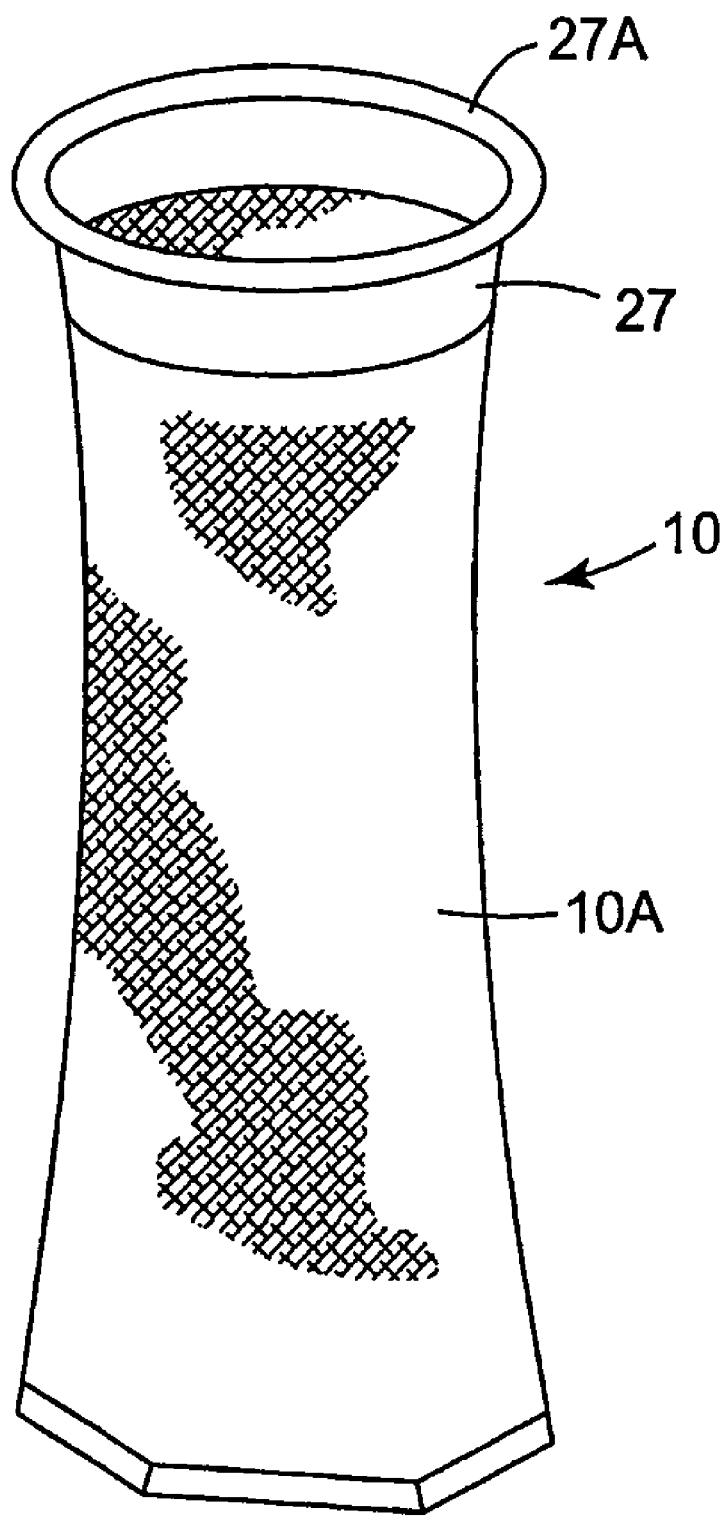
FIG. 4 is a perspective view of the filter shown in FIG. 3.
Figure 5:
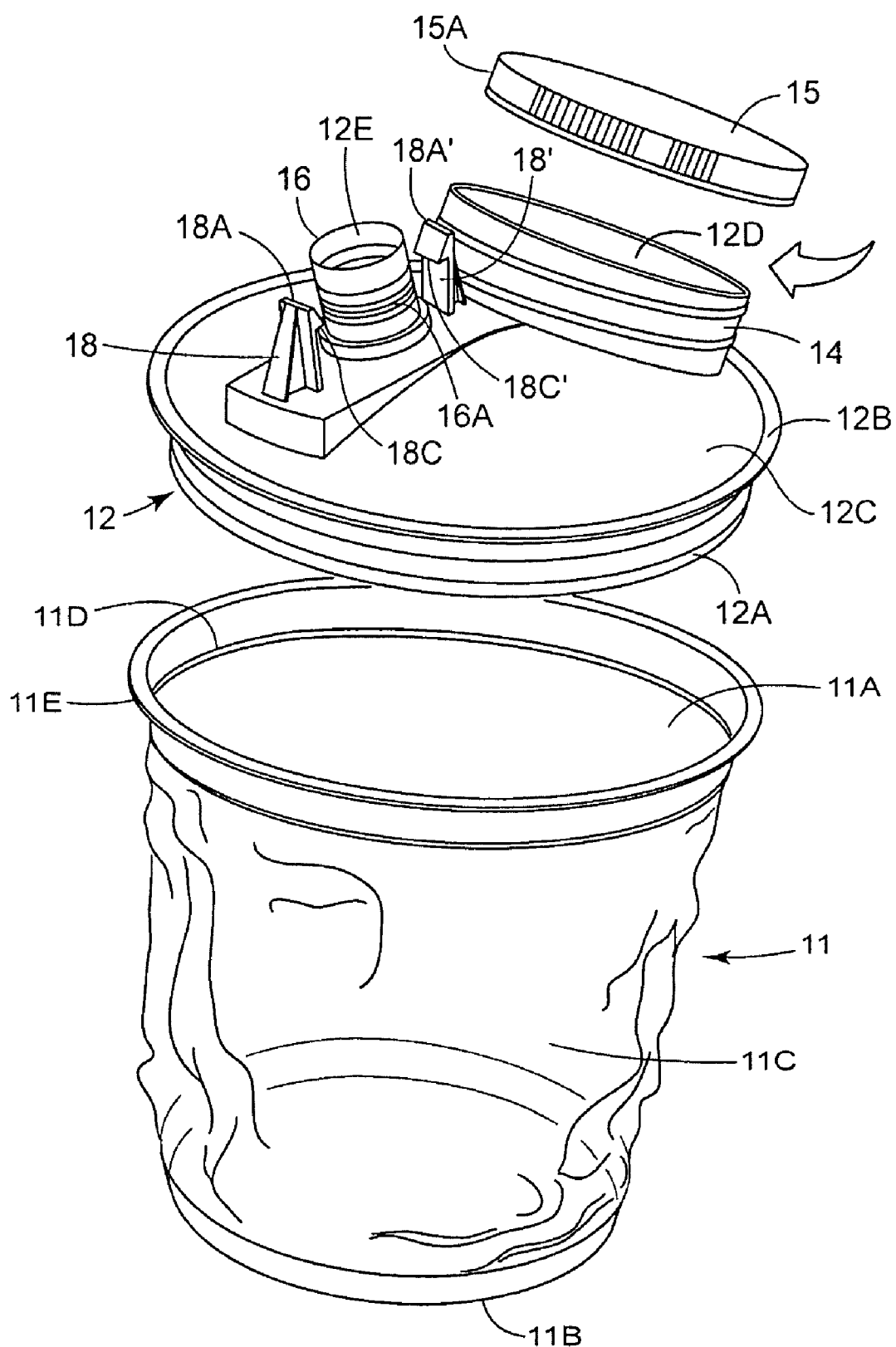
FIG. 5 is an exploded perspective view of the reservoir shown in FIG. 3.

Referring first to FIGS. 1 to 5 of the drawings, a hand held gravity feed spray gun 1 (FIG. 1) has an inlet adaptor 2 (FIGS. 1 and 2) for releasably-connecting a liquid supply assembly 3 (FIGS. 3 to 5).

The gun 1 (FIG. 1) comprises a body 4, a handle 5 which extends downwards from the rear end of the body, and a spray nozzle 6 at the front end of the body. The gun 1 is manually-operated by a trigger 7 which is pivotally-mounted on the sides of the gun 1.

The inlet adaptor 2 (FIGS. 1 and 2) is located on the top of the body 4 and communicates with an internal passageway (not visible) which extends through the body 4 to the nozzle 6.

In this embodiment, the inlet adaptor 2 is detachable, for example a screw fit in the body 4. In this way, the spray gun 1 can be converted for use with different types of liquid supply assemblies by selection and fitment of the appropriate adaptor 2. Also, a damaged adaptor 2 may be replaced.

In other embodiments (not shown), the inlet adaptor 2 may be an integral part of the body 4 of the spray gun 1. For example, the inlet adaptor 2 may be formed with the body 4 of the spray gun 1 or it may be formed separately and permanently secured to the body 4 of the spray gun 1. Alternatively, the adaptor 2 may be omitted and the liquid supply assembly mounted directly on the body 4 of the spray gun 1.

In use, the gun 1 is connected via a connector 8 at the lower end of the handle 5 to a source of compressed air (not shown) so that, when the user pulls on the trigger 7, compressed air is delivered through the gun to the nozzle 6. As a result, liquid, for example paint, delivered under gravity from the liquid supply assembly 3 to the nozzle 6 is atomised on leaving the nozzle 6 and forms a spray with the compressed air emerging from the nozzle 6.

Referring now to FIGS. 3 to 5, the liquid supply assembly 3 depicted comprises a reservoir 9 for the liquid (not shown) to be sprayed and a filter 10 for removing solid particles when the liquid is added to the reservoir 9.

The reservoir 9 comprises a container 11 and a lid 12 (FIG. 5). The container 11 is of generally cylindrical shape having an open end 11A and a closed end 11B connected by a flexible sidewall 11C. In this embodiment, the container 11 is transparent and is thermo-formed from a single piece of plastics material, preferably polyethylene or polypropylene. The container 11 can be of any suitable size but for use with hand held spray guns, typically has a capacity of 250, 500 or 800 ml for ease of handling and maneuverability of the spray gun to which the reservoir 9 is attached. The sidewall 11C may be provided with markings (not shown) to indicate the volume of liquid in the reservoir 9.

The lid 12 is of generally annular shape and in this embodiment is also made of transparent plastics material, preferably polyethylene or polypropylene, by injection moulding or other suitable process. The lid 12 has a dependent skirt 12A inset from the marginal edge 12B. The skirt 12A is received inside the open end 11A of the container 11 and locates against an annular step 11D in sidewall 11C. The marginal edge 12B of the lid 12 seats on an external flange 11E at the open end of the container 11. The lid 12 is permanently secured to the container 11 by adhesive or welding between the skirt 12A and sidewall 11C and between the marginal edge 12B and the flange 11E.

The lid 12 is comparatively rigid compared to the sidewall 11C of the container and maintains the annular shape of the open end 11A of the container 11. The closed end 11B of the container 11 is also comparatively rigid compared to the sidewall 11C and provides a flat base on which the reservoir 9 can stand, unsupported, in an upright condition with sidewall 11C extended (FIG. 3).

The sidewall 11C is flexible and can be made to collapse as liquid is withdrawn from the reservoir 9 for supply to the spray gun 1. As the sidewall 11C collapses, the comparatively rigid base 11B retains its form but moves towards the lid 12. The sidewall 11C collapses in a similar fashion to a plastic bag without being ruptured (e.g. by splitting, tearing or cracking).

The lid 12 has an upper surface 12C of convex shape and is formed with an inlet or filler opening 12D and an outlet or supply opening 12E. The filler opening 12D has a diameter of approximately half the diameter of the lid 12 and is bounded on the upper surface 12C by an annular spigot 14 having an external screw thread 14A. The filler opening 12D is closed by a detachable screw cap 15 having a skirt 15A with an internal screw thread complementary to the external screw thread 14A of spigot 14.

The supply opening 12E has a diameter of approximately one sixth the diameter of the lid 12 and is bounded on the upper surface 12C by a cylindrical spout 16. The spout 16 is sized to be a push-fit in a counterbore 17 (FIG. 2) at the outer free end of the adaptor 2.

In this embodiment, the spout 16 has external annular ribs 16A that provide a fluid-tight seal within the counterbore 17. It will be understood, however, that any suitable sealing means may be provided such as one or more O-rings in the counterbore 17 and/or on the spout 16.

The filler opening 12D is much larger than the supply opening 12E and is made as large as possible to facilitate addition of liquid to the reservoir 9 from the same end as the supply opening 12E. In this way, liquid can be added to the reservoir through the filler opening 12D with the reservoir in an upright position either free standing on the base or with the supply opening 12E attached to the spray gun 1.

In this embodiment, the ratio of the cross-sectional area of the filler opening 12D to that of the supply opening 12E is approximately 9:1 but it will be understood that different sizes of the openings 12D,12E may be employed.

The openings 12D,12E in the lid 12 are offset from the central longitudinal axis of the reservoir 9 and extend at an angle to the longitudinal axis. In this way, access to the filler opening 12D is improved for adding liquid to the reservoir 9 when the reservoir 9 is attached to the spray gun 1.

In this embodiment, opening 12D extends at an angle of approximately 17° and the opening 12E extends at an angle of approximately 13° to the longitudinal axis of the reservoir 9, i.e. at an angle of approximately 30° to each other. It will be understood that one or both openings 12D, 12E may be extend parallel to the longitudinal axis or at any angle to the longitudinal axis as desired.

The lid 12 is also provided with a pair of hook members 18,18' arranged on opposite sides of and spaced from the spout 16. The hook members 18,18', spout 16 and spigot 14 are aligned on a diameter of the lid 12.

Each hook member 18,18' is similar and has an enlarged head 18A,18A' respectively with a chamfer face 18B,18B' terminating at an undercut rib 18C,18C'.

The inlet adaptor 2 on the spray gun has an external flange 2A at the outer end for co-operating with the hook members 18,18' to secure releasably the reservoir to the spray gun with the spout 16 received in the counterbore 17.

As best shown in FIG. 2, the flange 2A comprises four arcuate recesses 19,20,21,22 uniformly spaced in a circumferential direction around the outer periphery such that the recesses 19,21 are opposite each other and the recesses 20,22 are opposite each other.

Each recess 19,20,21,22 leads in a clockwise direction (as viewed in FIG. 2) via a cam lobe 19A,20A,21A,22A to a flat 23,24,25,26 that terminates in an abutment 23A,24A,25A, 26A.

In use, to secure the reservoir 9 to the inlet adaptor 2, the hook members 18,18' are aligned with a pair of opposed recesses 19,21 or 20,22 in the flange 2A. The spout 16 is then pushed into the counterbore 17 so that the enlarged heads 18A,18A' at the distal ends of the hook members 18,18' pass through the aligned recesses 19,21 or 20,22.

The reservoir 9 is then rotated relative to the inlet adaptor 2 to cause the hook members 18,18' to ride over the cam lobes 19A,21A or 20A,22A and locate locking ribs 18C,18C' of the heads 18A,18A' behind the flats 23,25 or 24,26. In this way, the reservoir 9 is secured to the inlet adaptor 2 and axial separation of the reservoir 9 from the inlet adaptor 2 is resisted. The reservoir 9 can be detached from the inlet adaptor 2 by reversing the above operation.

The offset arrangement of the spout 16 from the central longitudinal axis of the reservoir 9 coupled with the push-twist fastening action to secure the reservoir 9 may result in the reservoir overhanging the body 4 of the spray gun 1 to one side. By providing two pairs of opposed recesses 19,21 and 20,22, the reservoir 9 can be attached using the pair of recesses 19,21 or 20,22 which reduces or eliminates overhang of the reservoir 9. In this way, balance of the assembled gun 1 and reservoir 9 is improved for ease of handling and maneuverability.

The filter 10 is inserted in the filler opening 12D and extends to the bottom of the reservoir 9 to remove any solid particles from liquid added to the reservoir 9 through the filler opening 12D with the cap 15 removed.

As best shown in FIG. 4, the filter 10 comprises a tubular mesh body 10A closed at one end and open at the other end. In this embodiment, the mesh body 10A is made of plastics such as polypropylene, polyester or polyamide (nylon) having a mesh size to remove particles of 40 microns or larger, potentially up to 1000 microns. It will be understood that the mesh body 10A may be made of other materials and may have any desired mesh size to suit any given application.

The filter 10 is provided with a comparatively rigid annular collar 27 at the open end of the mesh body 10A. The collar 27 is made of plastics, for example polyamide (nylon), polypropylene or polyethylene, and is integral with the mesh body 10A, for example the collar 27 may be moulded onto the mesh body 10A.

The collar 27 is sized to be a push-fit in the spigot 14 and has an external annular lip 27A at the outer end that locates on the outer end of the spigot 14 to position the filter 10 within the reservoir 9 and provide a seal between the screw cap 15 and the filler opening 12D. The mesh body 10A of the filter 10 is generally cylindrical having a maximum diameter similar to the diameter of the filler opening 12D so that the filter can be easily inserted in the filler opening 12D.

In this embodiment, the axial length of the mesh body 10A is such that the closed end is located adjacent to the base of the reservoir 9 when the collar 27 is seated in the spigot 14. In this way, surface area to volume ratio of the tubular mesh body 10A can be optimised for the mesh size of the filter and the properties of the liquid to be added.

As a result, the filter 10 has a high flow capability that allows liquid to be poured into the reservoir 9 through the filler opening 12D without overflowing or spilling. This permits rapid filling of the reservoir 9 with liquid that has been filtered to remove solid particles.

The mesh body 10A is flexible so as to be collapsible with the reservoir 9 as liquid is withdrawn from the reservoir 9 in use. In this way, the filter 10 can be left in place within the reservoir 9 after filling and the screw cap 15 attached to close the filler opening 12D and secure the filter 10 in position.

The outlet opening 12E is separate from the filler opening 12D and the presence of the filter 10 in the reservoir 9 does not interfere with flow of liquid to the spray gun 1 through the spout 16. Also, the reservoir 9 contains filtered liquid for supply to the spray gun 1 so that the flow of liquid is not dependent on the filtering the liquid at the time it is withdrawn from the reservoir 9.

As the level of the liquid falls in the reservoir 9, liquid contained in the mesh body 10A can pass through the mesh body 10A into the reservoir 9 at the surface of the liquid in the reservoir 9. As a result, the supply of the liquid to the spray gun 1 is not affected by filtering of the volume of liquid contained in the filter body 10A when the reservoir 9 is filled.

In an alternative arrangement, the filter 10 may be removed after filling with liquid and the screw cap 15 attached to close the filler opening 12D prior to attaching the reservoir 9 containing filtered liquid to the spray gun 1.

By leaving the filter 10 in the reservoir 9, the risk of spillage when the filter 10 is removed is avoided. Also, if it is desired to top-up the reservoir 9 with more liquid, the screw cap 15 can be removed and the liquid poured into the reservoir through the filler opening 12D with the filter 10 already in place to remove any solid particles.

Figure 6:
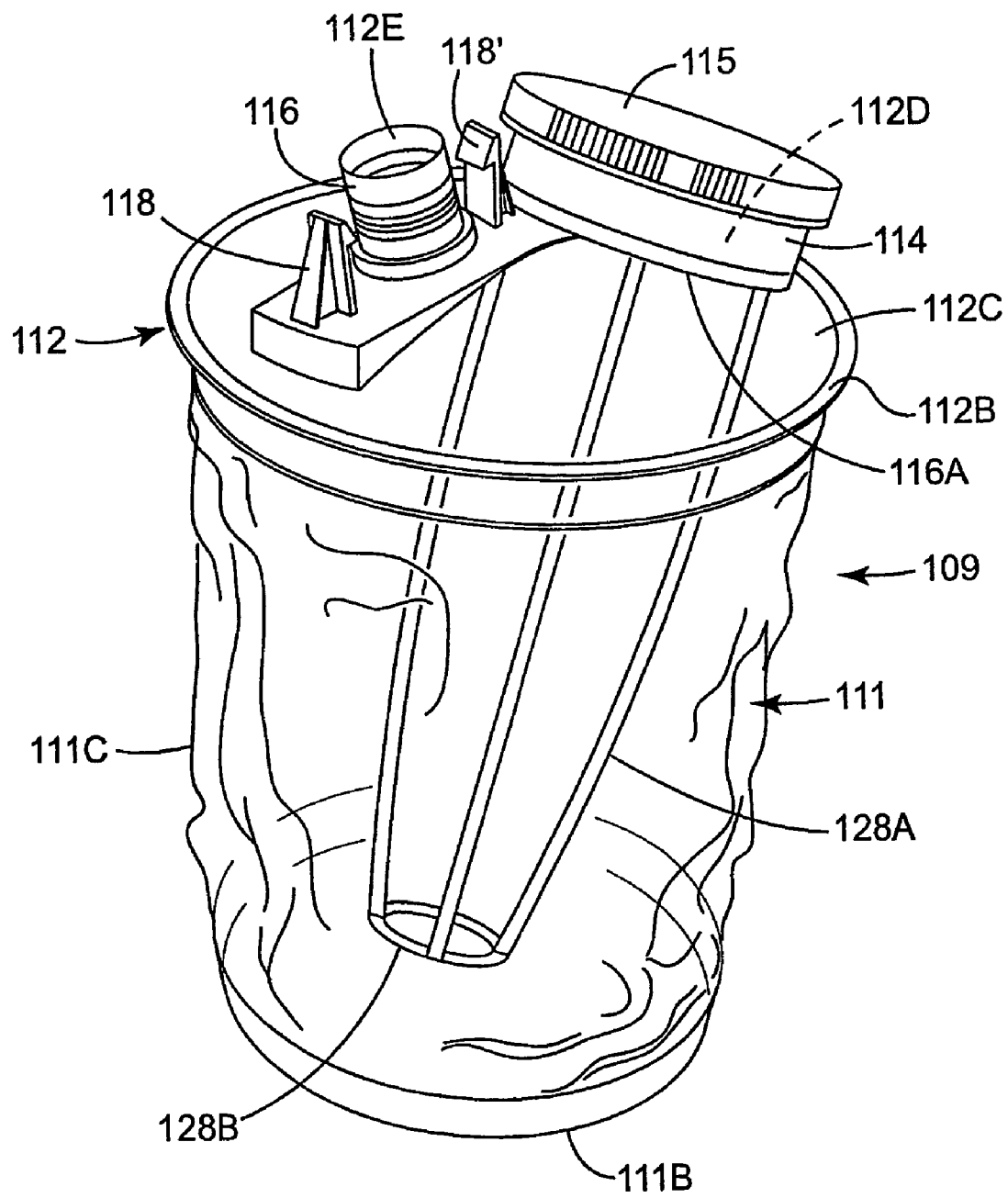
FIG. 6 is a perspective view of a liquid supply assembly for use with the spray gun of FIGS. 1 and 2 and incorporating a filter according to a second embodiment of the present invention.
Figure 7:
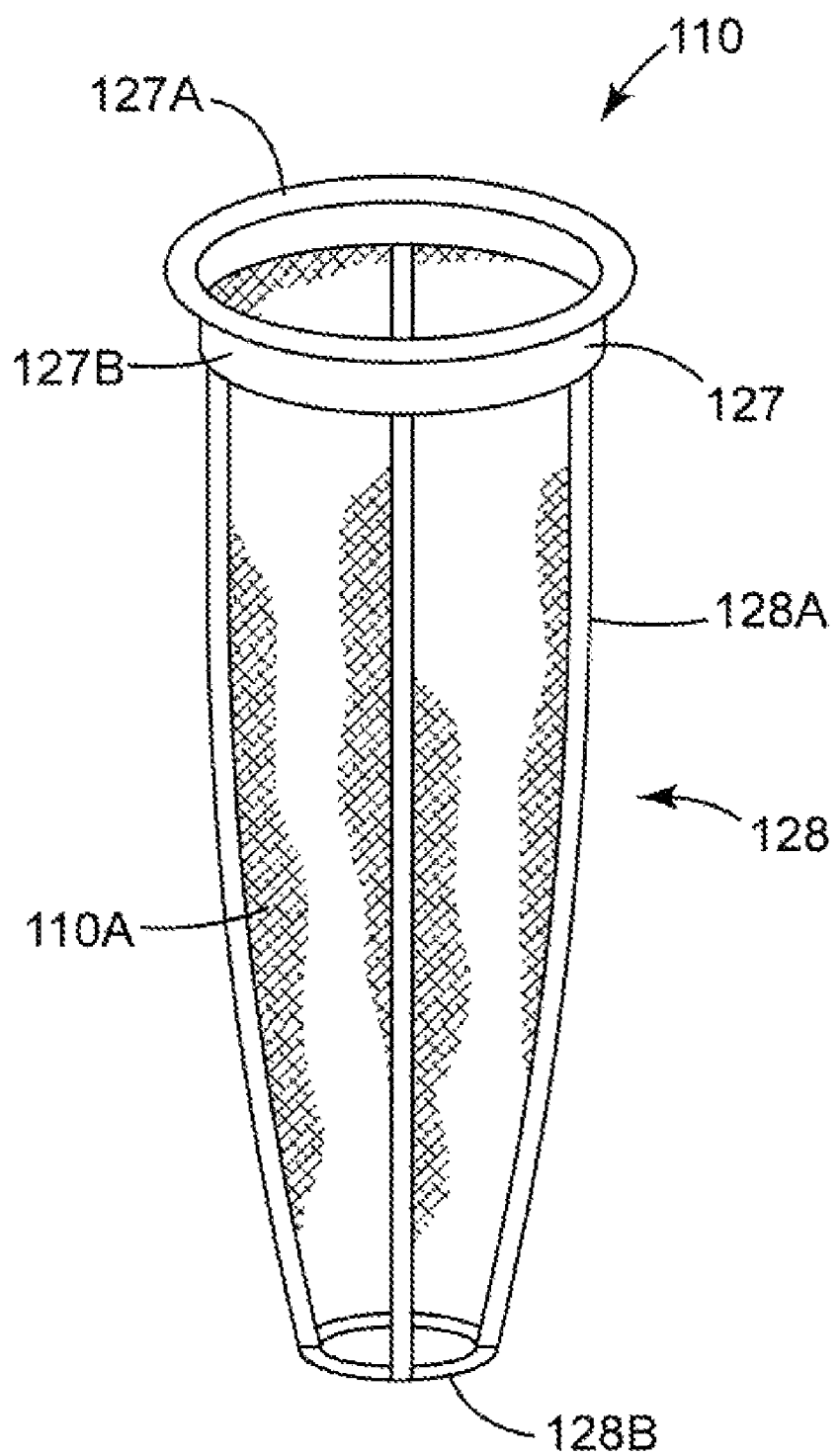
FIG. 7 is a perspective view of the filter shown in FIG. 6.

Referring now to FIGS. 6 and 7, a liquid supply assembly is shown having an alternative filter according to the invention. For convenience like reference numerals in the series 100 are used to indicate parts corresponding to the previous embodiment.

As shown in FIG. 7, the mesh body 110A of the filter 110 is arranged inside a support cage 128 integral with the collar 127. In this embodiment, the support cage 128 comprises four legs 128A extending axially from neck portion 127B of the collar 127 and joined to a base ring 128B at the closed end of the filter body 110A. The support cage 128 helps to maintain the tubular shape of the filter body 110A when liquid is added to the reservoir 109.

The surface area of the mesh body 110A is again optimised compared to the volume of the filter 110 to provide a high flow capability for rapid filling of the reservoir 109 with filtered liquid.

In this embodiment the legs 128A are comparatively rigid to provide strengthen and maintain the tubular shape of the mesh body 110A. With this arrangement, after filling the reservoir 109, the filter 110 is removed before the screw cap 115 is attached to close the filler opening 112D prior to securing the reservoir 109 to the spray gun 1 (FIG. 1). In this way, the filter 110 does not interfere with collapse of the reservoir 109 as liquid is withdrawn in use. In other respects, the construction and operation of this embodiment is similar to the previous embodiment and will be understood from the description already given.

In a modification (not shown), the cage 128 may be replaced by a plurality of annular support hoops (not shown) that extend around the mesh body 10A at axially spaced positions. The hoops provide strength to maintain the tubular shape of the mesh body 110A when liquid is added to the reservoir 109 but allow the filter 110 to collapse with the reservoir 109 as liquid is withdrawn in use. In this way, after filling with liquid, the reservoir 109 can be connected to the spray gun with the filter 110 left in place within the reservoir 109. Alternatively, the cage 128 may be formed to allow the filter 110 to collapse, for example the legs 128 could be flexible.

It will be appreciated from the foregoing description of exemplary embodiments that by having the filler opening 12D, 112D separate from the supply opening 12E, 112E liquid can be added to the reservoir 9, 109 with the reservoir 9, 109 connected to the spray gun 1. For this, the spray gun 1 is inverted from its normal position of use so that the reservoir 9, 109 is arranged with the lid 12, 112 uppermost to drain any liquid remaining in the reservoir 9, 109 to the bottom (the reservoir 9, 109 may have to be extended from the collapsed condition resulting from withdrawal of liquid during spraying). The screw cap 15, 115 can then be removed to add more liquid without risk of spillage. The cap 15, 115 can then be re-attached and the spray gun 1 re-inverted to its normal position of use for continued spraying.

Alternatively, the reservoir 9, 109 may be detached from the spray gun 1 and stood upright on a flat surface with the lid 12, 112 uppermost prior to removing the screw cap 15, 115 to add more liquid (the reservoir 9, 109 may have to be extended from the collapsed condition resulting from withdrawal of liquid during spraying). The cap 15, 115 can then be re-secured and the reservoir 9, 109 re-attached to the spray gun 1 to continue spraying.

On completion of spraying, the reservoir 9, 109 may be detached from the spray gun 1 and any paint remaining in the reservoir 9, 109 may be stored temporarily by closing off the supply hole 12E, 112E with any suitable means. The reservoir 9, 109 may then be re-attached to the spray gun 1 to use the remaining liquid. Alternatively, the reservoir 9, 109 may be discarded together with the filter 10, 110 after closing off the supply hole 12E, 112E.

It will be understood that the invention is not limited to the embodiments above-described.

For example, the arrangement of the filler opening separate from the supply opening allows the filter to be left in situ when attaching the reservoir to the spray gun and enables liquid to be added with the reservoir attached to the spray gun. The filler opening and supply opening may be provided in the lid at the same end of the reservoir. Alternatively, the filler opening may be provided in a sidewall or base wall of the container and the supply opening in the lid.

In another arrangement, the lid may be provided with a centrally located filler opening to receive the filter and a separate connector having an outlet spout for securing the reservoir to the spray gun. The connector is releasably attached to the lid around the filler opening and converts the lid for connection to the spray gun after the liquid has been added to the reservoir. With this arrangement the reservoir can be detached from the connector and liquid added to the reservoir with the filter inserted in the filler opening. The filter is then removed and the reservoir attached to the connector for securing the reservoir to the spray gun.

The lid and container may be permanently secured together as described. Alternatively, the lid and container may be releasably secured together. For example, the container may form a liner for a rigid outer container with the lid being releasably secured to the liner by a collar screwed onto the outer container. A liquid supply assembly of this type forms the subject matter of our International patent application published on 30 Jul. 1998 under No. WO 98/32539.

The reservoir may be collapsible as liquid is withdrawn. In this arrangement, the filter may be flexible so as to be collapsible with the reservoir when the filter is left in place and the reservoir attached to the spray gun. Alternatively, the filter may be stiff compared to the reservoir so that the filter has to be removed before attaching the reservoir to the spray gun.

The reservoir may be supplied empty with the filter in place so that the user only has to remove the screw cap and add the liquid to be sprayed. Alternatively, the filter may be supplied separately for insertion in the filler opening by the end user prior to adding liquid.

Where the reservoir is collapsible, it may supplied empty in a collapsed condition so as to reduce the space required for storage and transportation with the end user extending the reservoir before adding liquid. In this arrangement, the reservoir may be supplied with the filter in place in a collapsed condition or separate for insertion in the filler opening by the end user.

In another arrangement, the reservoir may be supplied pre-filled with liquid. In this arrangement, the filter may be supplied separately for insertion by the end user if it is desired to add liquid to the reservoir in use. Alternatively, the reservoir may be supplied with the filter in place so that liquid can be added by the end user when required.

In a further arrangement, the reservoir may be rigid. With this arrangement, the filter may be flexible or stiff and may be left in place when the reservoir is attached to the spray gun. The reservoir may be supplied empty or pre-filled with liquid and with the filter secured in place or separate. With this arrangement, an air vent is required in the liquid delivery system to allow liquid to be withdrawn from the reservoir in use, for example the reservoir may be provided with an air hole that can be opened when the reservoir is connected to the spray gun.

Other modifications and improvements will be apparent to those skilled in the art.

As will now be apparent, the present invention provides a high flow, drop-in filter for use with a liquid supply assembly for spraying apparatus such as spray guns to permit rapid filling of the reservoir. In this way, the liquid is filtered on being added to the reservoir to provide a supply of filtered liquid for delivery to the spray gun.

Furthermore, by providing a filler opening separate from the supply opening, the filter can be left in place when the reservoir is attached to the spray gun so as to be available if it is desired to top-up the reservoir with more liquid.

Additionally, by providing the filter with a flexible mesh body, the filter can be employed both in reservoirs that are collapsible as liquid is withdrawn and in reservoirs that are rigid.

It will also be appreciated that the exemplary embodiments described herein are intended to illustrate the diverse range and application of the invention and that features of the embodiments may be employed separately or in combination with any other features of the same or different embodiments.

Moreover, while the exemplary embodiments described and illustrated are believed to represent the best means currently known to the applicant, it will be understood that the invention is not limited thereto and that various modifications and improvements can be made within the scope of the claims hereinafter.

The invention claimed is:

1. A liquid supply assembly for use with spraying apparatus such as a spray gun, the liquid supply assembly comprising a container (11;111) for containing a liquid, the container comprising a plastic material and having a lid, a collapsible side wall and a base on which the side wall can stand unsupported in an upright position and said container capable of being mounted on a hand held spray gun (1) for supply of the liquid to an inlet of the spray gun (1) through an opening in the lid, and said lid also having a filler opening (12D), separate from the opening for connection to the spray gun, for adding liquid to the container, and a filter (10;110) for filtering liquid added to the container through the filler opening (12D), the filter (10;110) comprising an elongate tubular body (10A; 110A) closed at one end and open at the other end, the open end being provided with a support collar (27;127) having a lip portion (27A, 127A) and a neck portion (127B) that is integral with the tubular body of the filter and fits in the filler opening (12D) so that the filter body (10A;110A) extends away from the opening (12D) within the container when liquid is added to the container through the filler opening (12D) to filter liquid added to the container characterized in that: the tubular body (10A;110A) of the filter (10;110) has a surface area and volume within the container to permit filling of the container with liquid that is filtered on being added to the container to produce a supply of filtered liquid within the container for supply to the spray gun (1) when the container is connected to the spray gun (1); the support collar is connected to a cage (128) that surrounds the tubular body of the filter within the container; the filter is sufficiently rigid to maintain an elongate, tubular shape, the filter and cage are sufficiently flexible to allow the filter and cage to collapse along the whole length of the filter as the container side wall collapses during use; and the container can be extended from a collapsed condition and filled with the filter and cage in place during use.

2. The liquid supply assembly of claim 1 wherein the cage (128) comprises a plurality of legs (128A) extending from the support collar (127) at the open end of the tubular body (110A) to a base member (128B) at the closed end of the tubular body (110A).

3. The liquid supply assembly of claim 1 wherein the tubular body of the filter is provided with at least one annular support hoop spaced from the collar.

4. The liquid supply assembly of claim 3 in which the at least one annular support hoop is integral with the filter body.

5. The liquid supply assembly of claim 1 in which the elongate tubular body of the filter is tapered toward the closed end.

6. The liquid supply assembly of claim 1 in which the tubular body of the filter is oriented at an angle that is not parallel to the side wall of the container.

7. The liquid supply assembly of claim 6 in which the container is cylindrical, the lid is circular, the filler opening in the lid is larger than the opening for connection to the spray gun, and both of said openings are offset from the longitudinal axis of the container.

8. The liquid supply assembly of claim 1 in which the container is characterized by a shape having a longitudinal axis and the filler opening is offset from the container longitudinal axis.

9. The liquid supply assembly of claim 1 in which the filler opening is not an open end of the container.

10. The liquid supply assembly of claim 1 in which the container comprises a container and a circular lid, and the filler opening has a diameter of one-half the diameter of the lid or less.

11. The combination of a spray gun and a liquid supply assembly, the liquid supply assembly comprising a container for containing a liquid, the container being connected to the spray gun for supply of the liquid to an inlet of the spray gun and having a filler opening for adding liquid to the container, and a filter for filtering liquid added to the container through the filler opening, the filter comprising an elongate tubular body closed at one end and open at the other end, the open end being provided with a collar having a lip portion (27A, 127A) and a neck portion (127B) that is integral with the tubular body of the filter and fits in the filler opening so that the filter body extends away from the opening within the container when liquid is added to the container through the filler opening to filter liquid added to the container wherein, the container comprises an open-topped container (11;111), comprising a plastic material, and a lid (12;112) arranged to close the open end of the container (11;111) and forming the end wall in which the filler opening (12C) is formed, said lid having both the filler opening and a separate opening connected to the spray gun, the container (11;111) being collapsible as liquid is withdrawn from the container, the filter further comprises a cage that surrounds the tubular filter body and is connected to the collar, the filter is sufficiently rigid to maintain an elongate, tubular shape, the filter and cage are sufficiently flexible to allow the filter and cage to collapse along the whole length of the filter as the container collapses during use, and the container can be extended from a collapsed condition and filled with the filter and cage in place during use.

12. The combination of claim 11 wherein the lid is provided with an extension sleeve or cage surrounding the container to provide support for the container.

13. A liquid supply assembly for use with a spraying apparatus, said liquid supply assembly comprising:
  A) a container for containing a liquid, the container, comprising a plastic material, and having a lid, a collapsible side wall and a base on which the side wall can stand unsupported in an upright position, said container being attachable to a hand held spray gun for supply of liquid to the inlet of the spray gun through an opening in the lid, said lid having a filler opening, separate from the opening for attachment to the spray gun, for adding liquid to the container, and
  B) a filter for filtering liquid added to the container through the filler opening, the filter comprising an elongate tubular mesh body closed at one end and open at the other end, the open end having a support collar having a lip portion (27A, 127A) and a neck portion (127B) integral with the filter body which collar fits in the filler opening of the lid so that the filter body extends away from the opening within the container, said support collar being connected to a cage that is integral with the filter mesh body and effective to maintain the tubular shape of the filter when liquid is added to the container, said filter and cage being sufficiently flexible to allow them to collapse along the whole length of the filter as the container side wall collapses during use and the container capable of being extended from a collapsed condition and filled with the filter and cage in place during use.

* * * * *

UNITED STATES PATENT AND TRADEMARK OFFICE
CERTIFICATE OF CORRECTION

| | | |
|---|---|---|
| PATENT NO. | : 7,832,567 B2 | Page 1 of 1 |
| APPLICATION NO. | : 10/533743 | |
| DATED | : November 16, 2010 | |
| INVENTOR(S) | : Stephen Christopher Joseph | |

It is certified that error appears in the above-identified patent and that said Letters Patent is hereby corrected as shown below:

<u>Column 2</u>
Line 30, delete "reservoir," and insert -- reservoir. --, therefor.

<u>Column 3</u>
Line 13, delete "this" and insert -- the --, therefor.

<u>Column 6</u>
Line 5, delete "exiting" and insert -- existing --, therefor.
Line 17, after "detail" insert -- , --.

<u>Column 10</u>
Line 17, delete "embodiment" and insert -- embodiment, --, therefor.
Line 30, delete "10A" and insert -- 110A --, therefor.

Signed and Sealed this
Twenty-second Day of February, 2011

David J. Kappos
*Director of the United States Patent and Trademark Office*